Dec. 8, 1970     T. B. O'CONNELL     3,545,025

DENTAL CLEANING MEANS AND PROCESS FOR MAKING SAME

Filed Nov. 27, 1967

# United States Patent Office 3,545,025
Patented Dec. 8, 1970

3,545,025
DENTAL CLEANING MEANS AND PROCESS FOR MAKING SAME
Thomas Brian O'Connell, 105-06 Metropolitan Ave., Forest Hills, N.Y. 11375
Filed Nov. 27, 1967, Ser. No. 685,813
Int. Cl. A46b 9/04
U.S. Cl. 15—104.94          9 Claims

ABSTRACT OF THE DISCLOSURE

Dental cleaning means for temporary use comprises an elongate handle with a flat surface at one end and brushing means comprising sheet material bonded to said flat surface and a multiplicity of flexible resilient filaments united endwise with said sheet material and projecting approximately orthogonally therefrom. The cleaning means is preferably made by forming a corrugated sheet of plastic with flat marginal surfaces along one side edge, forming a pile material with resilient filaments projecting from a flexible base, bonding a strip of the pile material to the said marginal sheet and then severing the sheet along spaced corrugations to form a plurality of the dental cleaning means.

---

Figure 1:
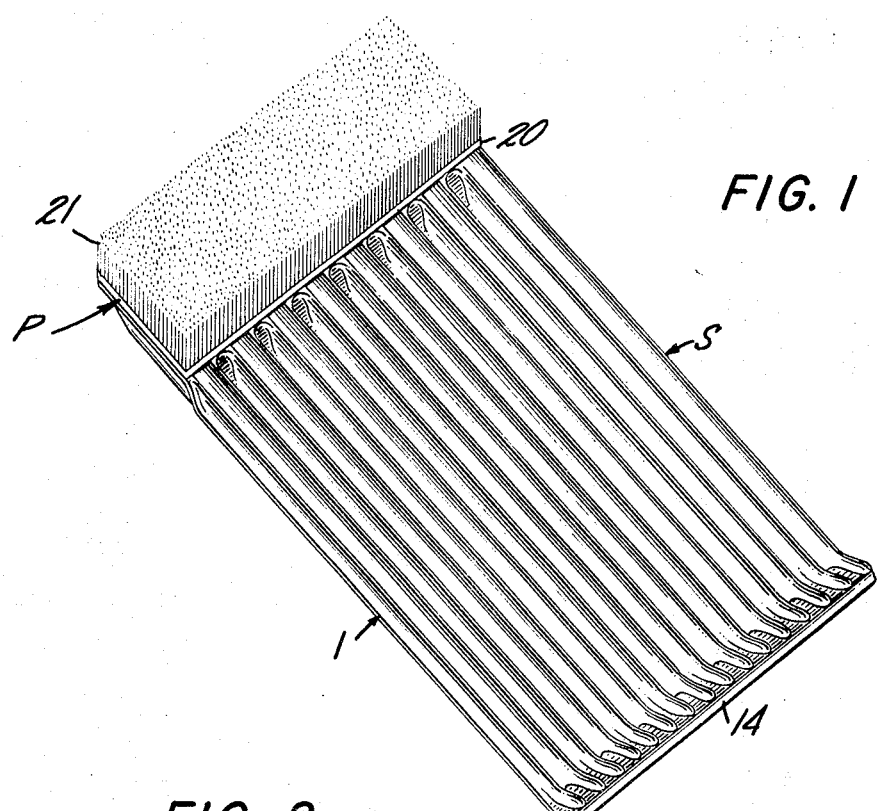

This invention relates to dental cleaning means and more particularly to cleaning means intended to be used as a temporary substitute for a conventional tooth brush. The dental cleaning means of the present invention is so inexpensive as economically to permit its disposal after even a single use.

There is a substantial need for disposable dental cleaning means as provided by the present invention. In underdeveloped parts of the world, the lack of proper personal hygienic care is a serious problem. Decay of teeth and infections of the mouth are common because conventional tooth brushes are too expensive for some persons and furthermore, living quarters are so primitive that it is extremely difficult to keep a conventional tooth brush clean.

Conventional tooth brushes are also inconvenient for use by soldiers in the field because it is frequently difficult to keep a tooth brush clean and undamaged over a period of time. Under such circumstances, a compact package of disposable dental cleaning means would be much preferred to a single conventional tooth brush. Similar considerations apply with respect to survival kits. Also a disposal dental cleaning means according to the present invention is useful under any circumstances in which water required to clean a conventional tooth brush is not available, for example, in a space vehicle. Similarly, a disposable cleaning means according to the present invention is very convenient for use by bedridden patients and for picnics. Furthermore, disposable dental cleaning means according to the present invention may readily be dispensed from vending machines in hotels, motels, airports, railway stations and the like for people who are travelling and have forgotten their conventional tooth brushes.

According to a further feature of the invention, the dental cleaning means is not only disposable but may also carry its own dentrifice. With such a cleaning means, there is the additional benefit of avoiding all of the disadvantages associated with the conventional packaging and dispensing of dentrifices such as tooth paste and tooth powder. Tooth paste and tooth powder are relatively expensive in underdeveloped countries. Moreover, the conventional application of tooth paste or tooth powder to a tooth brush and subsequently from the tooth brush to the teeth frequently involves substantial waste. Also tubes and cans of dentrifice are bulky and tubes of tooth paste may rupture.

While the dental cleaning means in accordance with the invention is sufficiently inexpensive that it can economically be used for a single use and then discarded, it is nevertheless sufficiently durable to permit repeated use of this if desired. It is hence suitable for use by a guest for the duration of his visit or for use by a patient during his stay in the hospital. It has the further advantage, particularly when used by children or by persons in underdeveloped countries not familiar with a tooth brush, that it provides controlled pressure of application of the cleaning means so as to avoid injury to the gums by excessive pressure.

In accordance with the invention, economy of manufacture is attained by the use of inexpensive mass production methods. A multiplicity of cleaning means is made in the form of a sheet or continuous strip which is then severed into individual cleaning devices. If desired, a plurality of the devices may be left partially attached to one another and may be packaged as a group so that individual devices can be broken off for use as required.

Figure 2:
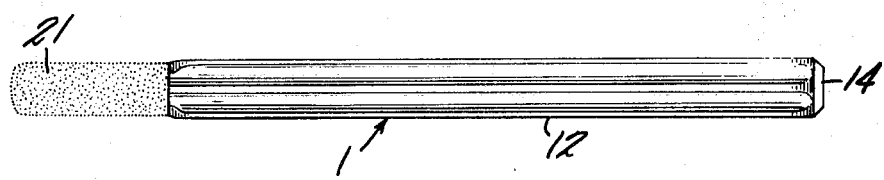
Figure 3:
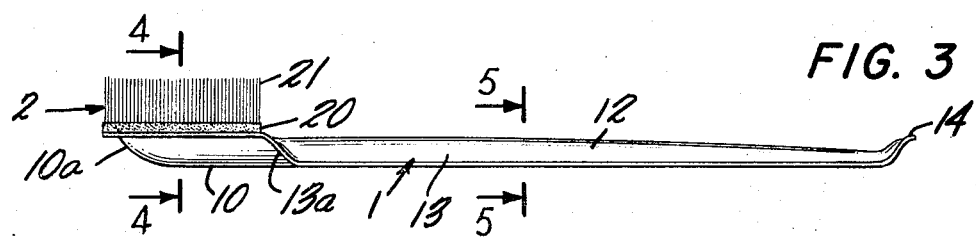
Figure 4:
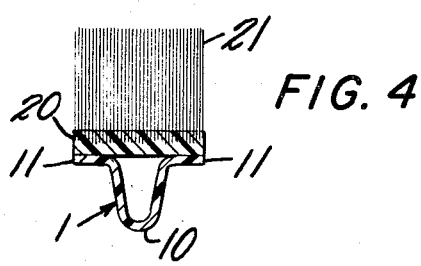
Figure 6:
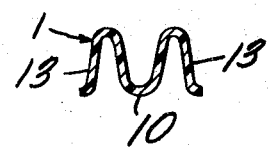
Figure 5:
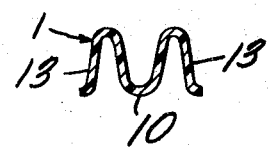

The invention will be more fully understood from the following detailed description in accordance with the accompanying drawings which illustrates a preferred embodiment and in which:

FIG. 1 illustrates manufacture of the dental cleaning means by showing in perspective a plurality of cleaning means before they are detached, FIGS. 2 and 3 are respectively a plan and side view of an individual cleaning means, FIGS. 4 and 5 are enlarged sectional views taken approximately on the lines 4—4 and 5—5 in FIG. 3, and FIG. 6 is a schematic enlarged cross section of a nylon filament showing a tubular construction.

As illustrated by way of example in FIGS. 2 to 5, an individual dental cleaning means in accordance with the invention comprises an elongate handle 1 and brushing means 2 affixed to the handle at one end.

The handle 1 is shown as comprising a strip of corrugated plastic sheet material having corrugations running lengthwise of the handle. A portion of the handle at the end to which the brushing means is to be affixed has a single corrugation 10 with flat surfaces 11 on opposite sides of the corrugation (FIG. 4). As seen in FIG. 3, the end of the corrugation 10 curves upwardly as indicated at 10a and merges into the flat surfaces. The corrugation 10 extends into an elongate gripping portion 12 of the handle which has also two half corrugations 13 on either side of the corrugation 10. Adjacent the brushing means 2, the half corrugations 13 curve upwardly as indicated at 13a and merge into the flat surfaces 11. At the opposite end, the handle preferably curves upwardly and merges into a transversely straight end portion 14. As seen in FIG. 3, the depth of the corrugations gradually decreases from a maximum depth near the brushing means 2 to a lesser depth adjacent the end 14 so that the handle has a gradually tapered configuration.

The brushing means 2 is a portion of pile material comprising sheet material 20 bonded to the flat surfaces 11 of the handle and a multiplicity of flexible resilient filaments 21 united endwise with the sheet material and projecting approximately perpendicularly therefrom. The filaments 21 are of suitable natural or synthetic fibrous material having appropriate characteristics for use as tooth brush bristles although in general they are somewhat more flexible than the bristles of conventional tooth brushes. Nylon filaments are particularly satisfactory as they are relatively stiff, resilient, tough and waterproof.

Preferably the nylon filaments are tubular with capillary bores as illustrated in FIG. 6. The filaments are closely spaced and are preferably uniformly distributed, although they may be arranged in groups or tufts if desired.

The filaments 21 are suitably united with the sheet material 20. For example, the brushing means may be produced as a tufted or pile fabric with the sheet material 20 formed as a woven, knitted or netted fabric base and the filaments 21 projecting from the base as cut pile. Alternatively, the filaments may be adhesively or otherwise bonded to a suitable fabric, paper or plastic sheet or strip. In the embodiment shown by way of example in the drawings, the ends of the filaments are embedded in a layer of plastic material while in a plastic condition and the material then sets to form a flexible sheet with the filaments projecting therefrom.

The reverse side of the sheet material 20 of the brushing means is suitably bonded to the surfaces 11 of the handle 1. The bonding may be effected with an appropriate adhesive, for example, a pressure sensitive adhesive. Alternatively, if the sheet material 20 of the brushing means 2 is plastic, it may be solvent welded to the handle. Preferably the bond between the brushing means and the handle is sufficiently permanent to avoid separation during use. If desired, the bond may be effected by a pressure sensitive or other suitable adhesive which permits the brushing means to be peeled off after a period of use and replaced by new brushing means. However, the handle is so inexpensive that the entire device is preferably discarded when it has served its purpose as a temporary dental cleaning means.

While the material and proportions of the dental cleaning means in accordance with the invention may be varied as desired, the following proportions have been found to be preferable. The handle is approximately 5 to 6 inches long and approximately ⅜ inch wide. The lengthwise corrugations in the handle have a depth of approximately 3/16 inch near the brushing means and approximately ⅛ inch near the opposite end of the handle. The corrugations in the handle have a center spacing of approximately 3/16 inch. The filaments of the brushing means have a length of about ¼ inch to ⅜ inch and have their lower ends embedded in plastic sheet material having a thickness of approximately 1/16 inch. The thickness of the corrugated sheet material of the handle is selected as a function of the stiffness of the material so as to provide a handle which is stiff enough to permit proper manipulation of the cleaning means and yet sufficiently flexible both in bending and in portion to control the amount of pressure applied in brushing the teeth and thereby avoid excessive pressure which might injure tender gums. While various plastics may be used for the handle, polystyrene is particularly suitable as it has desired properties of providing sufficient stiffness while still being resilient and sufficiently tough to avoid breakage when it is bent.

For further convenience of use, the brushing means is preferably impregnated with a suitable dentifrice material so that the device may be used without conventional tooth paste or tooth powder. The dentifrice is preferably applied in liquid form, for example, by spraying or dipping and is then permitted to dry on the brushing means. The use of tubular nylon filaments assists in the reception and retention of the liquid dentifrice. When the device is to be used, the dentifrice is activated by the application of a small amount of water or by the moisture of the mouth.

In the mass production of dental cleaning means in accordance with the invention, the handles 1 of a multiplicity of individual cleaning means are formed of a strip or sheet S of suitable plastic material which is molded, for example by a thermo-vacuum method, to provide the corrugations and other shape characteristics of the handles as illustrated in the drawings. A strip of pile material P is then bonded to the flat surfaces 11 provided at one side of the plastic sheet S. Individual cleaning implements are then obtained by cutting or otherwise severing the sheet S together with the pile material P along spaced corrugations. The dental cleaning means may be produced by a batch process in which strips of pile material P are applied to molded sheets S of the handle-forming material which are then severed to produce individual dental cleaning means, or as a continuous process in which a strip of pile material P is progressively applied to a continuous molded strip S of plastic material for the handles and the individual cleaning means are successively severed from the strip as the latter progressively advances. By either of these methods, a high rate of production at low cost is achieved.

Instead of individual cleaning means being completely severed from a sheet such as that shown in FIG. 1, a plurality of units can be left slightly attached to one another, for example, by scored portions. A "sheet" of cleaning means thus temporarily attached to one another may be packaged and sold as a unit, for example, with 5 or 10 cleaning means in a package. Individual cleaning means are then detached from the group as required for use.

While a preferred embodiment of the invention has been illustrated by way of example in the drawings and is herein particularly described, it will be understood that the invention is in no way limited to this embodiment and that modifications may be made as desired within the scope of the appended claims.

What I claim is:

1. A method of making dental cleaning means which comprises forming a sheet of moldable plastic material with transversely extending corrugations and with flat marginal surfaces along one side edge, forming a pile material comprising a flexible base and a multiplicity of flexible resilient filaments united endwise with said base and projecting approximately orthogonally therefrom, bonding a strip of said pile material to said flat marginal surfaces of said corrugated sheet, said strip extending along said one side edge, and severing said sheet along spaced corrugations to form a plurality of said dental cleaning means.

2. A method according to claim 1, in which said flexible base is plastic material and is solvent welded to said flat marginal surfaces of said corrugated sheet.

3. Dental cleaning means comprising molded plastic sheet material having a plurality of parallel corrugations with flat marginal surfaces along one side edge, side material extending along said one side edge crosswise of said corrugations and having a flexible base bonded to said flat surfaces and a multiplicity of flexible resilient filaments united endwise with said base and projecting approximately orthogonally therefrom, said sheet material and pile material having spaced severance lines parallel to said corrugations for dividing said sheet into a plurality of individual dental cleaning means.

4. Dental cleaning means according to claim 3, in which said sheet material is partially severed along said severance lines leaving said individual cleaning means slightly attached to one another whereby said individual cleaning means are detachable from one another as required for use.

5. Dental cleaning means according to claim 3, in which said severance lines are spaced apart by two said corrugations.

6. Dental cleaning means according to claim 3, in which said sheet material at the edge opposite said pile material curves upwardly and terminates in a straight edge portion.

7. Dental cleaning means according to claim 3, in which said filaments are tubular.

8. Dental cleaning means according to claim 7, in which said filaments are impregnated with dentifrice material.

9. Dental cleaning means according to claim 3, in which said flexible base comprises a flexible plastic sheet in which ends of said filaments are embedded.

References Cited

UNITED STATES PATENTS

| | | | |
|---|---|---|---|
| 1,327,757 | 1/1920 | Eggers | 15—167.1UX |
| 1,861,347 | 5/1932 | Johnson | 15—188 |
| 2,077,758 | 4/1937 | Johnson et al. | 15—167 |
| 2,705,335 | 4/1955 | Glassman et al. | 15—167X |
| 2,719,315 | 10/1955 | Sheehan | 15—167 X |
| 2,864,111 | 12/1958 | Rotceig | 15—167X |
| 2,879,533 | 3/1959 | Ward | 15—210X |
| 3,121,040 | 2/1964 | Shaw et al. | 15—159.1UX |
| 3,186,018 | 6/1965 | Shaw | 15—159.1UX |
| 3,298,507 | 1/1967 | Micciche | 15—167.1UX |
| 3,109,192 | 11/1963 | Levenson | 15—210 |

OTHER REFERENCES

Article in publication "Materials in Design Engineering," January 1958, pp. 129–134 entitled "Joining and Fastening Plastics."

DANIEL BLUM, Primary Examiner

U.S. Cl. X.R.

15—143, 210; 300—21